United States Patent
Kim et al.

(10) Patent No.: US 10,698,222 B1
(45) Date of Patent: Jun. 30, 2020

(54) METHOD FOR MONITORING BLIND SPOT OF CYCLE USING SMART HELMET FOR CYCLE RIDER AND BLIND SPOT MONITORING DEVICE USING THEM

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/732,039

(22) Filed: Dec. 31, 2019

Related U.S. Application Data

(60) Provisional application No. 62/799,282, filed on Jan. 31, 2019.

(51) Int. Cl.
*B60Q 1/00* (2006.01)
*G02B 27/01* (2006.01)
*A42B 3/04* (2006.01)

(52) U.S. Cl.
CPC ........ *G02B 27/0172* (2013.01); *A42B 3/0426* (2013.01); *G02B 2027/0123* (2013.01); *G02B 2027/0138* (2013.01)

(58) Field of Classification Search
CPC ............. G02B 27/0172; G02B 27/017; A42B 3/0406; A42B 3/0453; A42B 3/226;
(Continued)

(56) References Cited

U.S. PATENT DOCUMENTS 9,247,779 B1 * 2/2016 Aloumanis ............ G08G 1/137
10,219,571 B1 * 3/2019 Aloumanis ........ G06K 9/00805
(Continued)

*Primary Examiner* — Toan N Pham
(74) *Attorney, Agent, or Firm* — Kaplan Breyer Schwarz, LLP

(57) ABSTRACT

A method for monitoring blind spots of a cycle using a smart helmet for a rider is provided. The method includes steps of: a blind-spot monitoring device, (a) if a video image of 1-st blind spots corresponding to the smart helmet is acquired, instructing an object detector to detect objects on the video image and confirming 1-st objects in the 1-st blind spots; and (b) determining a smart helmet orientation and a cycle traveling direction by referring to sensor information from part of a GPS sensor, an acceleration sensor, and a geomagnetic sensor on the smart helmet, confirming 2-nd objects, among the 1-st objects, in 2-nd blind spots corresponding to the cycle by referring to the smart helmet orientation and the cycle traveling direction, and displaying the 2-nd objects via an HUD or sounding an alarm that the 2-nd objects are in the 2-nd blind spots via a speaker.

20 Claims, 6 Drawing Sheets

(58) Field of Classification Search
CPC ....... A42B 3/30; A42B 3/0426; A42B 3/0437;
G08G 1/137; G08G 1/123; A08B 7/06;
H04W 7/181; H04N 7/188; G06F 3/017;
G06F 3/012
USPC .............. 340/436, 995.26, 995.27, 427, 432;
345/7, 8, 158
See application file for complete search history.

(56) References Cited

U.S. PATENT DOCUMENTS

2016/0309827 A1* 10/2016 Dodson .................... A42B 3/30
2017/0131762 A1* 5/2017 Liang ................... A42B 3/0433

* cited by examiner

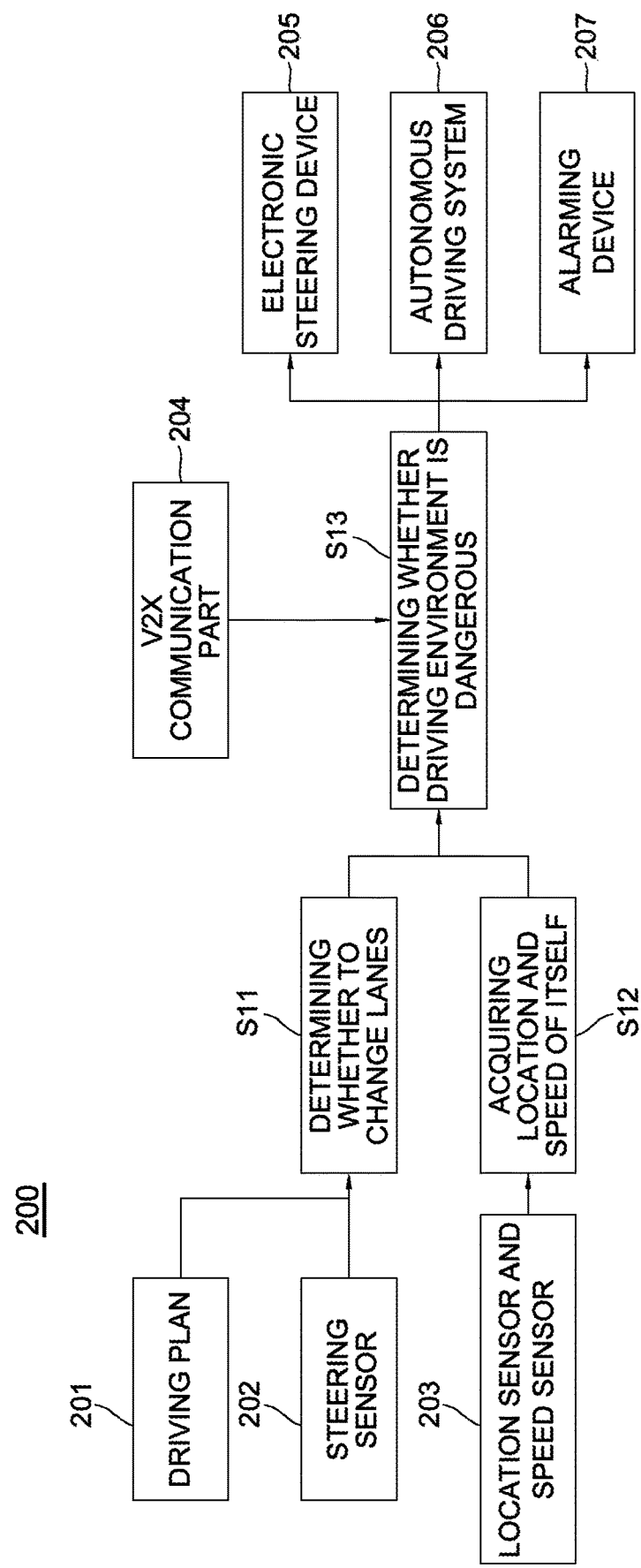

METHOD FOR MONITORING BLIND SPOT OF CYCLE USING SMART HELMET FOR CYCLE RIDER AND BLIND SPOT MONITORING DEVICE USING THEM

CROSS REFERENCE TO RELATED APPLICATION

This application claims the benefit of priority to U.S. Provisional Patent Application No. 62/799,282, filed on Jan. 31, 2019, the entire contents of which being incorporated herein by reference.

FIELD OF THE DISCLOSURE

The present disclosure relates to a blind-spot monitoring method and a blind-spot monitoring device for monitoring blind spots of a cycle using a smart helmet to be used by a rider of the cycle; and more particularly, to the blind-spot monitoring method and the blind-spot monitoring device for monitoring the blind spots using a video image acquired from the smart helmet worn by the rider of the cycle.

BACKGROUND OF THE DISCLOSURE

Riders of motorcycles have increased safety concerns than drivers of automotive vehicles. Additionally, due to the open area in which the riders are positioned when driving the motorcycles and the two-wheeled nature of the motorcycles, the availability of standard safety systems, such as airbags, is reduced.

Therefore, motorcycle riders must be careful to avoid traffic incidents. Specifically, the motorcycle riders must be careful to see the surrounding vehicle and make the motorcycle seen by drivers of the surrounding vehicles. One such instance in particular occurs when, at a stop, the single rear brake light of a motorcycle can be confused with one of the brake lights of a vehicle located in front of the motorcycle.

However, viewing angles of the riders who ride cycles such as bicycles or the motorcycles are limited, and accordingly, the riders cannot check all the surrounding environment of the cycles that are being driven, causing various accidents.

Accordingly, the inventors of the present disclosure propose a method for allowing the riders of the cycles to accurately perceive the surrounding environment.

SUMMARY OF THE DISCLOSURE

It is an object of the present disclosure to solve all the aforementioned problems.

It is another object of the present disclosure to allow a rider of a cycle in operation to perceive surrounding environment of the cycle.

It is still another object of the present disclosure to allow the rider of the cycle to ride the cycle safely as a result of perceiving the surrounding environment.

It is still another object of the present disclosure to transmit information acquired by the rider of the cycle to one or more nearby vehicles over V2X communication.

In accordance with one aspect of the present disclosure, there is provided a method for monitoring at least one blind spot of a cycle using a smart helmet to be used for a rider of the cycle, including steps of: (a) if at least one video image of one or more 1-st blind spots corresponding to the smart helmet worn by the rider is acquired, a blind-spot monitoring device performing a process of instructing an object detector to detect one or more objects on the video image and a process of confirming one or more 1-st objects located in the 1-st blind spots among the detected objects; and (b) the blind-spot monitoring device performing a process of determining a smart helmet orientation and a cycle traveling direction by referring to sensor information acquired from at least part of a GPS sensor, an acceleration sensor, and a geomagnetic sensor installed on the smart helmet, a process of confirming one or more 2-nd objects, among the 1-st objects, located in one or more 2-nd blind spots corresponding to the cycle by referring to the smart helmet orientation and the cycle traveling direction, and a process of displaying the 2-nd objects via a head-up display installed on the smart helmet or sounding an alarm representing that the 2-nd objects are located in the 2-nd blind spots via at least one speaker installed on the smart helmet.

As one example, the step of (b) further includes a step of: (b1) the blind-spot monitoring device performing a process of transmitting (i) rider blind-spot information acquired by referring to a viewing angle of the rider wearing the smart helmet and to one or more sensing angles of a radar sensor or a camera taking the video image and (ii) a cycle location, the cycle traveling direction, and a cycle traveling speed acquired by referring to the sensor information, to one or more nearby vehicles and one or more nearby smart helmets corresponding to one or more nearby cycles, to thereby perform at least one of processes of (1) allowing at least one specific nearby vehicle, among the nearby vehicles, located in one or more rider blind spots (1-a) to determine a possibility of a traffic accident between the specific nearby vehicle and the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, and thus (1-b) to give an alarm to at least one specific nearby driver of the specific nearby vehicle and (2) allowing at least one specific nearby smart helmet, corresponding to at least one specific nearby cycle located in the rider blind spots, among the nearby smart helmets (2-a) to determine a possibility of a traffic accident between the specific nearby cycle and the cycle by referring to (i) a nearby cycle location, a nearby cycle traveling direction, and a nearby cycle traveling speed acquired from sensor information of the specific nearby smart helmet and (ii) the cycle location, the cycle traveling direction, and the cycle traveling speed and thus (2-b) to give an alarm to at least one specific nearby rider corresponding to the specific nearby cycle.

As one example, if the specific nearby driver of the specific nearby vehicle located in the rider blind spots operates a steering wheel of the specific nearby vehicle to move into a nearby front area of the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, the blind-spot monitoring device performs a process of instructing the specific nearby vehicle located in the rider blind spots to prevent the steering wheel from rotating or to vibrate the steering wheel in order to alert the specific nearby driver.

As one example, in case the specific nearby vehicle located in the rider blind spots is an autonomous vehicle, if a driving plan of the autonomous vehicle is determined as representing moving into the nearby front area of the cycle by referring to (i) an autonomous vehicle location, an autonomous vehicle traveling direction, and an autonomous vehicle traveling speed acquired from sensor information of the autonomous vehicle and (ii) the cycle location, the cycle traveling direction, and the cycle traveling speed, the blind-spot monitoring device performs a process of instructing the autonomous vehicle located in the rider blind spots to prevent itself from changing lanes due to the driving plan.

As one example, at the step of (b), the blind-spot monitoring device performs a process of calculating an angular difference between the smart helmet orientation and the cycle traveling direction, a process of converting one or more 1-st locations of the 1-st objects into one or more relative locations corresponding to the cycle traveling direction by using the angular difference, and a process of determining at least part of the 1-st objects, corresponding to at least part of the relative locations matching the 2-nd blind spots, as the 2-nd objects.

As one example, at the step of (a), the blind-spot monitoring device performs a process of transmitting the video image to the object detector to allow the object detector to (i) input the video image into a convolutional layer, to thereby allow the convolutional layer to generate at least one feature map by applying convolution operation to the video image, (ii) input the feature map into a region proposal network, to thereby allow the region proposal network to generate one or more proposal boxes corresponding to the objects on the feature map, (iii) input the feature map into a pooling layer, to thereby allow the pooling layer to generate at least one feature vector by applying pooling operation to one or more regions, corresponding to the proposal boxes, on the feature map, (iv) input the feature vector into a fully connected layer, to thereby allow the fully connected layer to apply fully-connected operation to the feature vector, and (v) input an output from the fully connected layer respectively into a classification layer and a regression layer, to thereby allow the classification layer and the regression layer to respectively output class information and regression information on each of the objects corresponding to each of the proposal boxes, and thus to detect the objects in the video image.

As one example, the object detector has been learned by a learning device performing (i) a process of inputting a training image into the convolutional layer, to thereby allow the convolutional layer to generate a feature map for training by applying convolution operation to the training image, (ii) a process of inputting the feature map for training into the region proposal network, to thereby allow the region proposal network to generate one or more proposal boxes for training corresponding to one or more objects for training on the feature map for training, (iii) a process of inputting the feature map for training into the pooling layer, to thereby allow the pooling layer to generate a feature vector for training by applying pooling operation to one or more regions, corresponding to the proposal boxes for training, on the feature map for training, (iv) a process of inputting the feature vector for training into the fully connected layer, to thereby allow the fully connected layer to apply fully-connected operation to the feature vector for training, (v) a process of inputting at least one output for training from the fully connected layer respectively into the classification layer and the regression layer, to thereby allow the classification layer and the regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the fully connected layer and the convolutional layer by backpropagating the losses such that the losses are minimized.

In accordance with another aspect of the present disclosure, there is provided a method for monitoring at least one blind spot of a cycle using a smart helmet to be used for a rider of the cycle, including steps of: (a) if sensor information is acquired from at least part of a GPS sensor, an acceleration sensor, and a geomagnetic sensor installed on the smart helmet worn by the rider of the cycle, a blind-spot monitoring device performs a process of acquiring a cycle location, a cycle traveling direction, and a cycle traveling speed by referring to the sensor information; and (b) the blind-spot monitoring device performing a process of transmitting (i) rider blind-spot information acquired by referring to a viewing angle of the rider wearing the smart helmet and to one or more sensing angles of a radar sensor or a camera installed on the smart helmet and (ii) the cycle location, the cycle traveling direction, and the cycle traveling speed, to one or more nearby vehicles and one or more nearby smart helmets corresponding to one or more nearby cycles, to thereby perform at least one of processes of (1) allowing at least one specific nearby vehicle, among the nearby vehicles, located in one or more rider blind spots (1-a) to determine a possibility of a traffic accident between the specific nearby vehicle and the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, and thus (1-b) to alert at least one specific nearby driver of the specific nearby vehicle and (2) allowing at least one specific nearby smart helmet, corresponding to at least one specific nearby cycle located in the rider blind spots, among the nearby smart helmets (2-a) to determine a possibility of a traffic accident between the specific nearby cycle and the cycle by referring to (i) a nearby cycle location, a nearby cycle traveling direction, and a nearby cycle traveling speed acquired from sensor information of the specific nearby smart helmet and (ii) the cycle location, the cycle traveling direction, and the cycle traveling speed and thus (2-b) to alert at least one specific nearby rider corresponding to the specific nearby cycle.

As one example, at the step of (b), if the specific nearby driver of the specific nearby vehicle located in the rider blind spots operates a steering wheel of the specific nearby vehicle to move into a nearby front area of the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, the blind-spot monitoring device performs a process of instructing the specific nearby vehicle located in the rider blind spots to prevent the steering wheel from rotating or to vibrate the steering wheel in order to alert the specific nearby driver.

As one example, in case the specific nearby vehicle located in the rider blind spots is an autonomous vehicle, if a driving plan of the autonomous vehicle is determined as representing moving into the nearby front area of the cycle by referring to (i) an autonomous vehicle location, an autonomous vehicle traveling direction, and an autonomous vehicle traveling speed acquired from sensor information of the autonomous vehicle and (ii) the cycle location, the cycle traveling direction, and the cycle traveling speed, the blind-spot monitoring device performs a process of instructing the autonomous vehicle located in the rider blind spots to prevent itself from changing lanes due to the driving plan.

In accordance with still another aspect of the present disclosure, there is provided a blind-spot monitoring device for monitoring at least one blind spot of a cycle using a smart helmet to be used for a rider of the cycle, including: at least one memory that stores instructions; and at least one processor configured to execute the instructions to perform or support another device to perform: (I) if at least one video image of one or more 1-st blind spots corresponding to the smart helmet worn by the rider is acquired, a process of instructing an object detector to detect one or more objects on the video image and a process of confirming one or more 1-st objects located in the 1-st blind spots among the detected objects, and (II) a process of determining a smart helmet orientation and a cycle traveling direction by referring to sensor information acquired from at least part of a GPS sensor, an acceleration sensor, and a geomagnetic sensor installed on the smart helmet, a process of confirming one or more 2-nd objects, among the 1-st objects, located in one or more 2-nd blind spots corresponding to the cycle by referring to the smart helmet orientation and the cycle traveling direction, and a process of displaying the 2-nd objects via a head-up display installed on the smart helmet or sounding an alarm representing that the 2-nd objects are located in the 2-nd blind spots via at least one speaker installed on the smart helmet.

As one example, the process of (II) further includes: (II-1) a process of transmitting (i) rider blind-spot information acquired by referring to a viewing angle of the rider wearing the smart helmet and to one or more sensing angles of a radar sensor or a camera taking the video image and (ii) a cycle location, the cycle traveling direction, and a cycle traveling speed acquired by referring to the sensor information, to one or more nearby vehicles and one or more nearby smart helmets corresponding to one or more nearby cycles, to thereby perform at least one of processes of (1) allowing at least one specific nearby vehicle, among the nearby vehicles, located in one or more rider blind spots (1-a) to determine a possibility of a traffic accident between the specific nearby vehicle and the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, and thus (1-b) to give an alarm to at least one specific nearby driver of the specific nearby vehicle and (2) allowing at least one specific nearby smart helmet, corresponding to at least one specific nearby cycle located in the rider blind spots, among the nearby smart helmets (2-a) to determine a possibility of a traffic accident between the specific nearby cycle and the cycle by referring to (i) a nearby cycle location, a nearby cycle traveling direction, and a nearby cycle traveling speed acquired from sensor information of the specific nearby smart helmet and (ii) the cycle location, the cycle traveling direction, and the cycle traveling speed and thus (2-b) to give an alarm to at least one specific nearby rider corresponding to the specific nearby cycle.

As one example, if the specific nearby driver of the specific nearby vehicle located in the rider blind spots operates a steering wheel of the specific nearby vehicle to move into a nearby front area of the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, the processor performs a process of instructing the specific nearby vehicle located in the rider blind spots to prevent the steering wheel from rotating or to vibrate the steering wheel in order to alert the specific nearby driver.

As one example, in case the specific nearby vehicle located in the rider blind spots is an autonomous vehicle, if a driving plan of the autonomous vehicle is determined as representing moving into the nearby front area of the cycle by referring to (i) an autonomous vehicle location, an autonomous vehicle traveling direction, and an autonomous vehicle traveling speed acquired from sensor information of the autonomous vehicle and (ii) the cycle location, the cycle traveling direction, and the cycle traveling speed, the processor performs a process of instructing the autonomous vehicle located in the rider blind spots to prevent itself from changing lanes due to the driving plan.

As one example, at the process of (II), the processor performs a process of calculating an angular difference between the smart helmet orientation and the cycle traveling direction, a process of converting one or more 1-st locations of the 1-st objects into one or more relative locations corresponding to the cycle traveling direction by using the angular difference, and a process of determining at least part of the 1-st objects, corresponding to at least part of the relative locations matching the 2-nd blind spots, as the 2-nd objects.

As one example, at the process of (I), the processor performs a process of transmitting the video image to the object detector to allow the object detector to (i) input the video image into a convolutional layer, to thereby allow the convolutional layer to generate at least one feature map by applying convolution operation to the video image, (ii) input the feature map into a region proposal network, to thereby allow the region proposal network to generate one or more proposal boxes corresponding to the objects on the feature map, (iii) input the feature map into a pooling layer, to thereby allow the pooling layer to generate at least one feature vector by applying pooling operation to one or more regions, corresponding to the proposal boxes, on the feature map, (iv) input the feature vector into a fully connected layer, to thereby allow the fully connected layer to apply fully-connected operation to the feature vector, and (v) input an output from the fully connected layer respectively into a classification layer and a regression layer, to thereby allow the classification layer and the regression layer to respectively output class information and regression information on each of the objects corresponding to each of the proposal boxes, and thus to detect the objects in the video image.

As one example, the object detector has been learned by a learning device performing (i) a process of inputting a training image into the convolutional layer, to thereby allow the convolutional layer to generate a feature map for training by applying convolution operation to the training image, (ii) a process of inputting the feature map for training into the region proposal network, to thereby allow the region proposal network to generate one or more proposal boxes for training corresponding to one or more objects for training on the feature map for training, (iii) a process of inputting the feature map for training into the pooling layer, to thereby allow the pooling layer to generate a feature vector for training by applying pooling operation to one or more regions, corresponding to the proposal boxes for training, on the feature map for training, (iv) a process of inputting the feature vector for training into the fully connected layer, to thereby allow the fully connected layer to apply fully-connected operation to the feature vector for training, (v) a process of inputting at least one output for training from the fully connected layer respectively into the classification layer and the regression layer, to thereby allow the classification layer and the regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the fully connected layer and the convolutional layer by backpropagating the losses such that the losses are minimized.

In accordance with still yet another aspect of the present disclosure, there is provided a blind-spot monitoring device for monitoring at least one blind spot of a cycle using a smart helmet to be used for a rider of the cycle, including: at least one memory that stores instructions; and at least one processor configured to execute the instructions to perform or support another device to perform: (I) if sensor information is acquired from at least part of a GPS sensor, an acceleration sensor, and a geomagnetic sensor installed on the smart helmet worn by the rider of the cycle, a process of acquiring a cycle location, a cycle traveling direction, and a cycle traveling speed by referring to the sensor information, and (II) a process of transmitting (i) rider blind-spot information acquired by referring to a viewing angle of the rider wearing the smart helmet and to one or more sensing angles of a radar sensor or a camera installed on the smart helmet and (ii) the cycle location, the cycle traveling direction, and the cycle traveling speed, to one or more nearby vehicles and one or more nearby smart helmets corresponding to one or more nearby cycles, to thereby perform at least one of processes of (1) allowing at least one specific nearby vehicle, among the nearby vehicles, located in one or more rider blind spots (1-a) to determine a possibility of a traffic accident between the specific nearby vehicle and the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, and thus (1-b) to alert at least one specific nearby driver of the specific nearby vehicle and (2) allowing at least one specific nearby smart helmet, corresponding to at least one specific nearby cycle located in the rider blind spots, among the nearby smart helmets (2-a) to determine a possibility of a traffic accident between the specific nearby cycle and the cycle by referring to (i) a nearby cycle location, a nearby cycle traveling direction, and a nearby cycle traveling speed acquired from sensor information of the specific nearby smart helmet and (ii) the cycle location, the cycle traveling direction, and the cycle traveling speed and thus (2-b) to alert at least one specific nearby rider corresponding to the specific nearby cycle.

As one example, at the process of (II), if the specific nearby driver of the specific nearby vehicle located in the rider blind spots operates a steering wheel of the specific nearby vehicle to move into a nearby front area of the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, the processor performs a process of instructing the specific nearby vehicle located in the rider blind spots to prevent the steering wheel from rotating or to vibrate the steering wheel in order to alert the specific nearby driver.

As one example, in case the specific nearby vehicle located in the rider blind spots is an autonomous vehicle, if a driving plan of the autonomous vehicle is determined as representing moving into the nearby front area of the cycle by referring to (i) an autonomous vehicle location, an autonomous vehicle traveling direction, and an autonomous vehicle traveling speed acquired from sensor information of the autonomous vehicle and (ii) the cycle location, the cycle traveling direction, and the cycle traveling speed, the processor performs a process of instructing the autonomous vehicle located in the rider blind spots to prevent itself from changing lanes due to the driving plan.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIG. 6 is a drawing schematically illustrating an operation of an autonomous vehicle traveling by referring to information, on the blind spots of the cycle, from the smart helmet in the method for monitoring the blind spots of the cycle using the smart helmet wearable by the rider of the cycle in accordance with one example embodiment of the present disclosure.

DETAILED DESCRIPTION OF THE PREFERRED EMBODIMENTS

Figure 1:
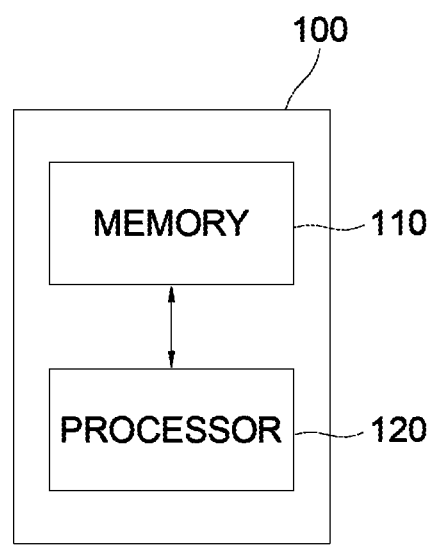
FIG. 1 is a drawing schematically illustrating a blind-spot monitoring device for monitoring one or more blind spots of a cycle using a smart helmet wearable by a rider of the cycle in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

FIG. 1 is a drawing schematically illustrating a blind-spot monitoring device for monitoring one or more blind spots of a cycle using a smart helmet of a rider of the cycle in accordance with one example embodiment of the present disclosure. By referring to FIG. 1, the blind-spot monitoring device 100 may include a memory 110 for storing instructions to monitor the blind spots of the cycle by referring to sensor information acquired from one or more sensors installed on the smart helmet worn by the rider of the cycle, and a processor 120 for performing processes to monitor the blind spots of the cycle by referring to the sensor information acquired from the sensors installed on the smart helmet according to the instructions in the memory 110. Throughout the present disclosure, the cycle may include a unicycle, a bicycle, a tricycle, a two-wheeled motorcycle, a one-wheeled or three-wheeled motor vehicle, etc., but the scope of the present disclosure is not limited thereto.

Specifically, the blind-spot monitoring device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 2:
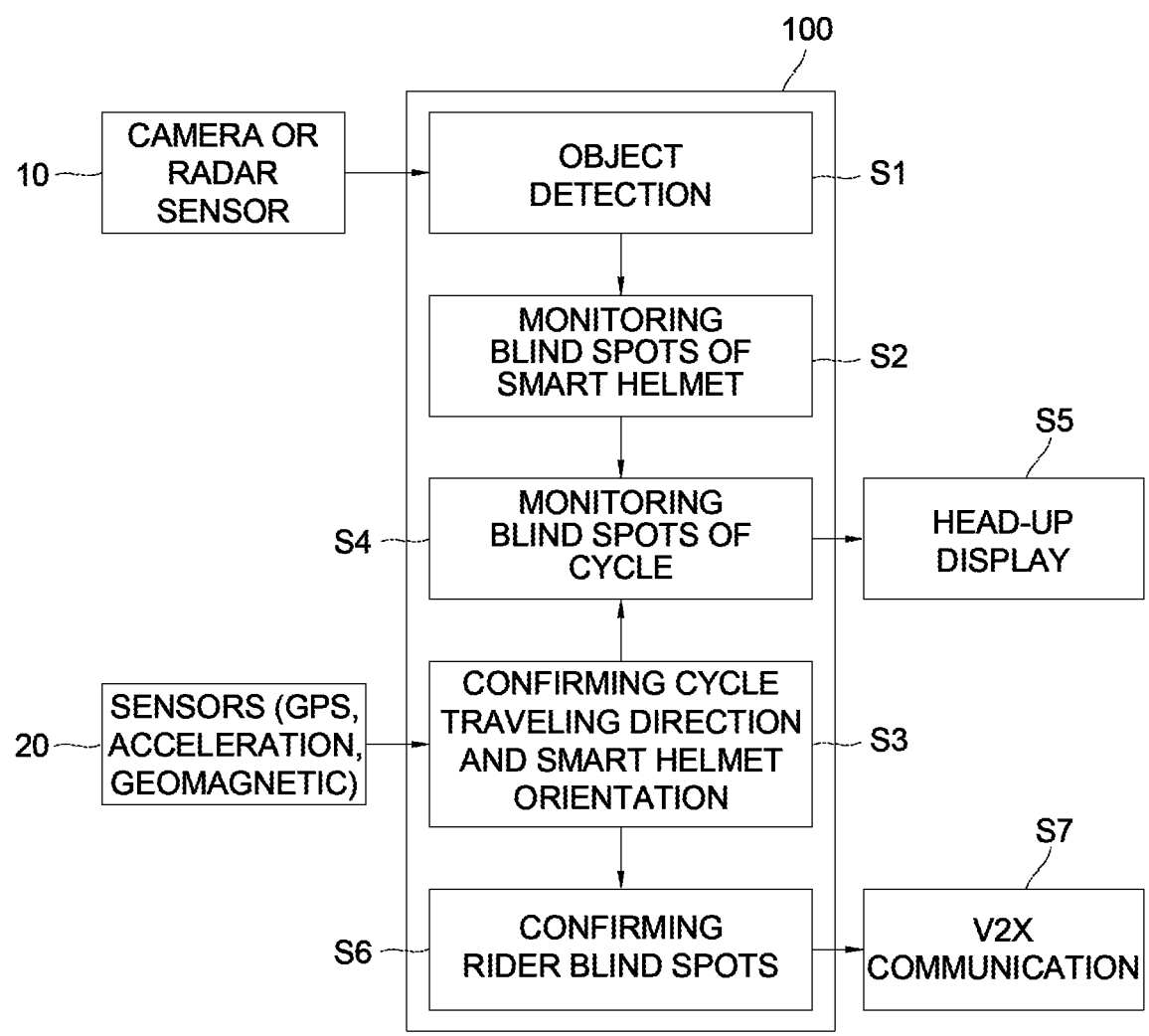
FIG. 2 is a drawing schematically illustrating a blind-spot monitoring method for monitoring the blind spots of the cycle using the smart helmet wearable by the rider of the cycle in accordance with one example embodiment of the present disclosure.

A method for monitoring the blind spots of the cycle by referring to the sensor information acquired from the sensors installed on the smart helmet by using the blind-spot monitoring device 100 in accordance with one example embodiment of the present disclosure is described by referring to FIG. 2 as follows.

First, if at least one video image of one or more 1-st blind spots is acquired from at least one camera or at least one radar sensor 10 installed on the smart helmet worn by the rider, the blind-spot monitoring device 100 may perform a process of instructing an object detector to detect one or more objects on the video image, at a step of S1. Herein, the radar sensor may include a LiDAR sensor, a laser sensor, an ultrasonic sensor, etc., and may include any sensors capable of scanning their surrounding environment and acquiring images corresponding to the surrounding environment.

Figure 3:
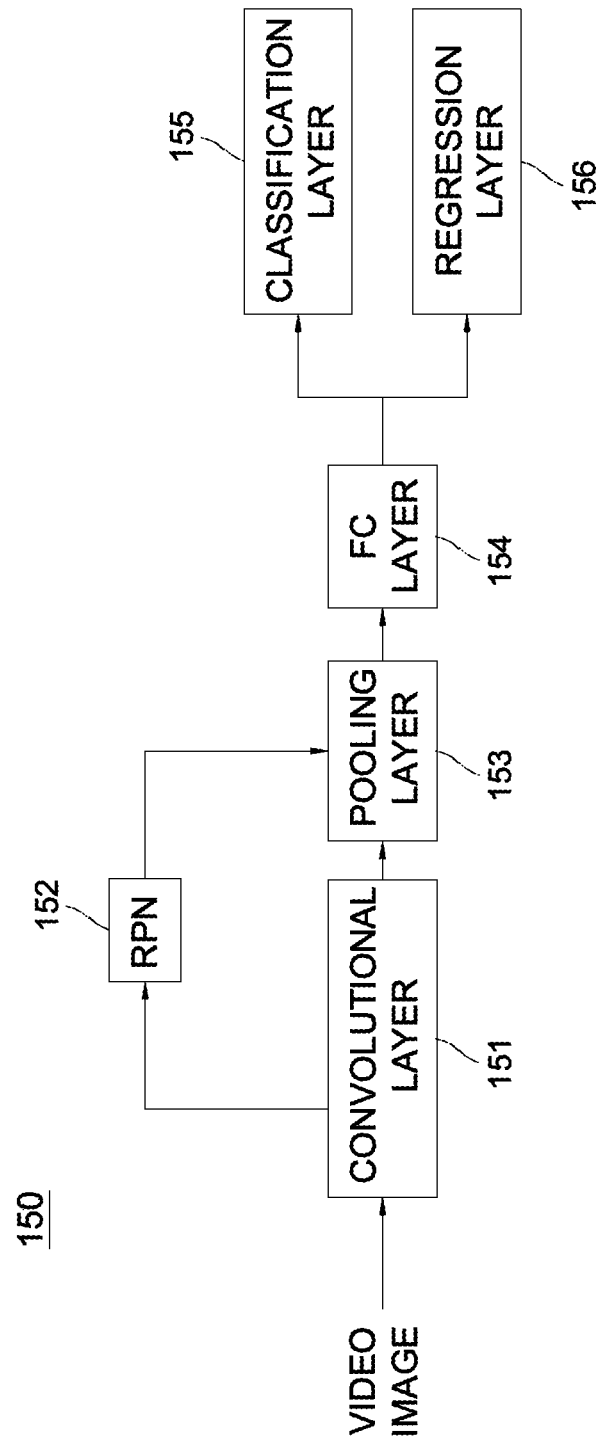
FIG. 3 is a drawing schematically illustrating an object detector for detecting one or more objects from at least one video image in a method for monitoring the blind spots of the cycle using the smart helmet wearable by the rider of the cycle in accordance with one example embodiment of the present disclosure.

As one example, by referring to FIG. 3, the blind-spot monitoring device 100 may transmit the video image to the object detector 150. Then, the object detector 150 may input the video image into a convolutional layer 151, to thereby allow the convolutional layer 151 to apply its at least one convolution operation to the video image and thus to generate at least one feature map. And, the object detector 150 may input the feature map into a region proposal network 152, to thereby allow the region proposal network 152 to output one or more proposal boxes corresponding to one or more objects on the feature map. Thereafter, the object detector 150 may input the feature map into a pooling layer 153, to thereby allow the pooling layer 153 to output at least one feature vector by applying its pooling operation to one or more regions, corresponding to the proposal boxes, on the feature map. And, the object detector 150 may input the feature vector into a fully connected layer 154, to thereby allow the fully connected layer 154 to apply its fully-connected operation to the feature vector, and may input at least one output from the fully connected layer 154 respectively into a classification layer 155 and a regression layer 156, to thereby allow the classification layer 155 and the regression layer 156 to respectively generate class information and regression information on each of the objects corresponding to each of the proposal boxes, and as a result, may detect the objects on the video image.

Herein, the object detector may have been learned by a learning device.

That is, the learning device may input at least one training image into the convolutional layer 151, to thereby allow the convolutional layer 151 to generate at least one feature map for training by applying its at least one convolution operation to the training image, and may input the feature map for training into the region proposal network 152, to thereby allow the region proposal network 152 to output one or more proposal boxes for training, corresponding to one or more objects for training, on the feature map for training. And, the learning device may input the feature map for training into the pooling layer 153, to thereby allow the pooling layer 153 to generate at least one feature vector for training by applying its pooling operation to one or more regions, corresponding to the proposal boxes for training, on the feature map for training, and may input the feature vector for training into the fully connected layer 154, to thereby allow the fully connected layer 154 to apply its fully-connected operation to the feature vector for training. Thereafter, the learning device may input at least one output for training from the fully connected layer 154 respectively into the classification layer 155 and the regression layer 156, to thereby allow the classification layer 155 and the regression layer 156 to respectively generate class information for training and regression information for training on each of one or more objects for training corresponding to each of the proposal boxes for training. And, the learning device may allow a loss layer to calculate one or more losses by referring to the class information for training and the regression information for training and their respective corresponding GTs, and may update at least one parameter of at least one of the fully connected layer 154 and the convolutional layer 151 via backpropagation using the losses such that the losses are minimized. And, as a result of repeating the above processes, the learning device may learn the object detector.

Next, the blind-spot monitoring device 100 may perform a process of confirming one or more 1-st objects, located in the 1-st blind spots, among the objects detected by the object detector, at a step of S2.

Herein, the 1-st blind spots may be the blind spots corresponding to the smart helmet, and may be areas, within a preset distance from the smart helmet, that cannot be visually perceived by the rider.

Next, if the sensor information is acquired from at least part of the sensors 20, for example, a GPS sensor, an acceleration sensor, and a geomagnetic sensor, installed on the smart helmet, then the blind-spot monitoring device 100 may confirm a smart helmet orientation and a cycle traveling direction at a step of S3, by referring to the sensor information from at least part of the GPS sensor, the acceleration sensor, and the geomagnetic sensor.

And, the blind-spot monitoring device 100 may perform a process of confirming one or more 2-nd objects, located in one or more 2-nd blind spots corresponding to the cycle, among the 1-st objects, by referring to the smart helmet orientation and the cycle traveling direction at a step of S4. Herein, the 2-nd blind spots may be areas near the cycle that cannot be visually perceived by the rider.

That is, the blind-spot monitoring device 100 may perform a process of calculating at least one angular difference between the smart helmet orientation and the cycle traveling direction, a process of converting one or more 1-st locations of the 1-st objects into one or more relative locations corresponding to the cycle traveling direction by using the angular difference, and a process of determining at least part of the 1-st objects, corresponding to at least part of the relative locations matching the 2-nd blind spots, as the 2-nd objects.

Figure 4:
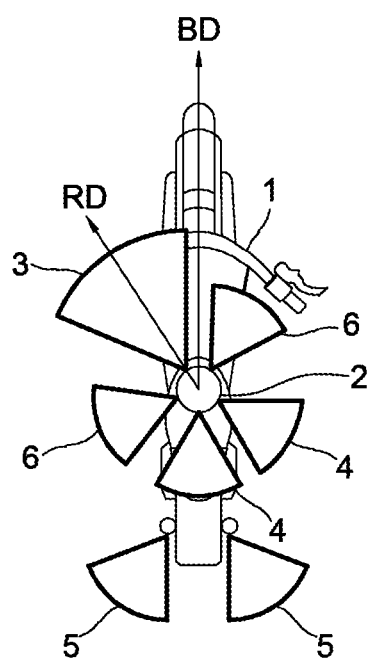
FIG. 4 is a drawing schematically illustrating a process of monitoring the blind spots of the cycle in the method for monitoring the blind spots of the cycle using the smart helmet wearable by the rider of the cycle in accordance with one example embodiment of the present disclosure.

As one example, by referring to FIG. 4, one or more sensing angles 4 of the camera or the radar sensor installed on the smart helmet 2 worn by the rider of the cycle 1 may correspond to the blind spots of the smart helmet, that is, one or more rear areas of the smart helmet, and the blind spots 5 of the cycle 1 may be one or more preset areas set as areas where the rider cannot perceive visually depending on a traveling direction of the cycle 1.

Herein, the smart helmet orientation of the smart helmet 2 may be changed by the rider, and in such a case, the 1-st objects located in the 1-st blind spots, which are the blind spots of the smart helmet detected by the object detector, may not be the objects detected from the 2-nd blind spots which are the blind spots of the cycle.

Therefore, the blind-spot monitoring device 100 may determine an angle between the smart helmet orientation RD and the cycle traveling direction BD on a basis of the smart helmet 2, may convert the 1-st locations of the 1-st objects into the relative locations on a basis of the cycle traveling direction BD by referring to the determined angle, and may determine at least part of the 1-st objects, whose relative locations are in the 2-nd blind spots 5, as the 2-nd objects, to thereby detect the objects located in the blind spots 5 of the cycle.

Next, the blind-spot monitoring device 100 may perform a process of displaying the 2-nd objects, at a step of S5, located in the 2-nd blind spots, which are the blind spots of the cycle, via a head-up display installed on the smart helmet, or a process of sounding an alarm representing that the 2-nd objects are located in the 2-nd blind spots via at least one speaker installed on the smart helmet, to thereby allow the rider to safely drive the cycle by perceiving that the objects, that is, one or more pedestrians, one or more vehicles, or one or more other cycles, are located in the blind spots of the cycle.

Also, at a same time, the blind-spot monitoring device 100 may confirm one or more rider blind spots at a step of S6 by referring to a viewing angle of the rider wearing the smart helmet and the sensing angles of the radar sensor or the camera taking the video image.

That is, by referring to FIG. 4 again, the rider blind spots 6 may be determined, which are out of ranges of the sensing angles 4 of the camera or the radar sensor installed on the smart helmet and the viewing angle 3 of the rider wearing the smart helmet.

Therefore, the blind-spot monitoring device 100 may transmit, at a step of S7, (i) rider blind-spot information on the rider blind spots acquired by referring to the viewing angle of the rider wearing the smart helmet and the sensing angles of the camera taking the video image or the radar sensor, and (ii) a cycle location, a cycle traveling direction, and a cycle traveling speed acquired by referring to the sensor information from the smart helmet, to one or more nearby vehicles and one or more nearby smart helmets of one or more nearby cycles. Herein, the blind-spot monitoring device 100 may transmit the rider blind-spot information, the cycle location, the cycle traveling direction, and the cycle traveling speed over V2X (vehicle to everything) communication.

Then, a specific nearby vehicle located in one of the rider blind spots may alert a specific nearby driver of the specific nearby vehicle using a probability of a traffic accident between the specific nearby vehicle and the cycle, where the probability may be determined by referring to (i) a vehicle location, a vehicle traveling direction, and a vehicle traveling speed acquired from the sensor information of the specific nearby vehicle and (ii) the cycle location, the cycle traveling direction, and the cycle traveling speed acquired from the blind-spot monitoring device 100. Also, at least one specific nearby smart helmet, corresponding to at least one specific nearby cycle located in the rider blind spots, among the nearby smart helmets, may determine a possibility of a traffic accident between the specific nearby cycle and the cycle by referring to (i) a nearby cycle location, a nearby cycle traveling direction, and a nearby cycle traveling speed acquired from sensor information of the specific nearby smart helmet and (ii) the cycle location, the cycle traveling direction, and the cycle traveling speed acquired from the blind-spot monitoring device 100, and may thus alert at least one specific nearby rider corresponding to the specific nearby cycle.

Herein, if the specific nearby driver of the specific nearby vehicle located in the rider blind spots operates a steering wheel of the specific nearby vehicle to move into a nearby front area of the cycle by referring to (i) the vehicle location, the vehicle traveling direction, and the vehicle traveling speed acquired from sensor information of the specific nearby vehicle and (ii) the cycle location, the cycle traveling direction, and the cycle traveling speed acquired from the blind-spot monitoring device 100, the specific nearby vehicle located in the rider blind spots may perform a process of preventing the steering wheel from rotating or of vibrating the steering wheel in order to alert the specific nearby driver.

Figure 5:
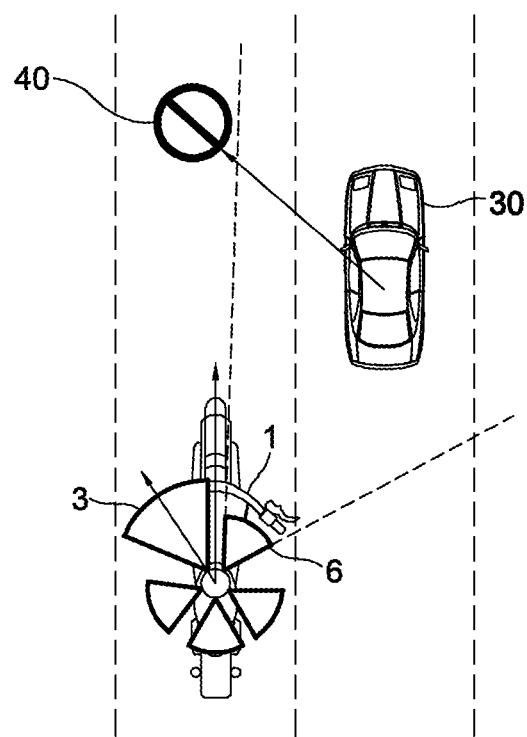
FIG. 5 is a drawing schematically illustrating a process of traveling the cycle and its nearby vehicles in the method for monitoring the blind spots of the cycle using the smart helmet wearable by the rider of the cycle in accordance with one example embodiment of the present disclosure.

As one example, by referring to FIG. 5, a vehicle 30 traveling near the cycle 1 may perform a process of confirming whether the vehicle 30 is located in one of the rider blind spots 6 by referring to the rider blind-spot information received from the blind-spot monitoring device 100, and a process of, if the vehicle 30 is determined as located in said one of the rider blind spots 6, confirming a dangerous area 40 having a probability of a traffic accident larger than a preset threshold in case the vehicle traveling direction of the vehicle 30 is changed to pointing to an area where the rider of the cycle 1 is not paying attention, that is, to the nearby front area of the cycle where the rider is not visually observing, and thus preventing the traffic accident between the vehicle 30 and the rider 1 by stopping the vehicle 30 from entering the dangerous area 40.

Also, in case that the specific nearby vehicle located in the rider blind spots is an autonomous vehicle, if a driving plan of the autonomous vehicle is determined as representing moving into the nearby front area of the cycle by referring to (i) an autonomous vehicle location, an autonomous vehicle traveling direction, and an autonomous vehicle traveling speed acquired from sensor information of the autonomous vehicle and (ii) the cycle location, the cycle traveling direction, and the cycle traveling speed, then the autonomous vehicle located in the rider blind spots may prevent itself from changing lanes due to the driving plan of the autonomous vehicle.

As one example, by referring to FIG. 6, the autonomous vehicle 200 may determine whether to change the lanes, and if lane-changing is to be performed, may determine a lane-changing direction by referring to the driving plan 201 and at least one signal from at least one steering sensor 202 at a step of S11, and while the autonomous vehicle 200 drives itself by referring to the autonomous vehicle location, the autonomous vehicle traveling direction, and the autonomous vehicle traveling speed using the sensor information acquired from at least one location sensor and at least one speed sensor 203 at a step of S12, if the rider blind-spot information, the cycle location, the cycle traveling direction, and the cycle traveling speed are acquired via a V2x communication part 204, the autonomous vehicle 200 may determine that itself is located in one of the rider blind spots by referring to the rider blind-spot information.

And, if the autonomous vehicle 200 is determined as located in said one of the rider blind spots, the autonomous vehicle 200 may determine whether a driving environment of the autonomous vehicle 200 is dangerous, at a step of S13.

That is, in case that the driving plan of the autonomous vehicle is determined as representing moving from said one of the rider blind spots into the nearby front area of the cycle by referring to (i) the autonomous vehicle location, the autonomous vehicle traveling direction, and the autonomous vehicle traveling speed acquired from the sensor information of the autonomous vehicle and (ii) the cycle location, the cycle traveling direction, and the cycle traveling speed, then the autonomous vehicle may determine that the probability of the traffic accident is larger than the preset threshold because the rider of the cycle cannot perceive the autonomous vehicle 100.

Then, the autonomous vehicle 200 may operate an electronic steering device 205 to make the steering wheel difficult to move or to vibrate the steering wheel, to thereby allow the driver of the autonomous vehicle 200 to perceive a dangerous situation. Also, the autonomous vehicle 200 may operate an autonomous driving system 206 to stop the autonomous vehicle 200 from changing the lanes toward the cycle, in order to prevent the traffic accident. Also, the autonomous vehicle 200 may operate an alarming device 207 to alert the driver of the autonomous vehicle or the rider of the cycle using light, sound, etc., in order to prevent the traffic accident.

The blind-spot monitoring device is shown above as simultaneously performing a process of monitoring cycle blind spots and a process of transmitting the rider blind-spot information to the nearby vehicles or the nearby smart helmets, however, as another example, the blind-spot monitoring device may only perform the process of transmitting the rider blind-spot information to the nearby vehicles or the nearby smart helmets.

That is, if the sensor information is acquired from at least part of the GPS sensor, the acceleration sensor, and the geomagnetic sensor installed on the smart helmet worn by the rider of the cycle, the blind-spot monitoring device of the smart helmet may perform a process of acquiring the cycle location, the cycle traveling direction, and the cycle traveling speed by referring to the sensor information from the smart helmet. And, the blind-spot monitoring device 100 may perform a process of transmitting (i) the rider blind-spot information acquired by referring to the viewing angle of the rider wearing the smart helmet and to the sensing angles of the radar sensor or the camera installed on the smart helmet and (ii) the cycle location, the cycle traveling direction, and the cycle traveling speed, to the nearby vehicles and the nearby smart helmets corresponding to the nearby cycles, to thereby perform at least one of processes of (1) allowing the specific nearby vehicle, among the nearby vehicles, located in one of the rider blind spots (1-a) to determine a possibility of a traffic accident between the specific nearby vehicle and the cycle by referring to (i) the vehicle location, the vehicle traveling direction, and the vehicle traveling speed acquired from the sensor information of the specific nearby vehicle and (ii) the cycle location, the cycle traveling direction, and the cycle traveling speed, and thus (1-b) to alert the specific nearby driver of the specific nearby vehicle and (2) allowing the specific nearby smart helmet, corresponding to the specific nearby cycle located in one of the rider blind spots, among the nearby smart helmets (2-a) to determine a possibility of a traffic accident between the specific nearby cycle and the cycle by referring to (i) the nearby cycle location, the nearby cycle traveling direction, and the nearby cycle traveling speed acquired from the sensor information of the specific nearby smart helmet and (ii) the cycle location, the cycle traveling direction, and the cycle traveling speed and thus (2-b) to alert the specific nearby rider corresponding to the specific nearby cycle.

Herein, if the specific nearby driver of the specific nearby vehicle located in the rider blind spots operates the steering wheel of the specific nearby vehicle to move into the nearby front area of the cycle by referring to (i) the vehicle location, the vehicle traveling direction, and the vehicle traveling speed acquired from the sensor information of the specific nearby vehicle and (ii) the cycle location, the cycle traveling direction, and the cycle traveling speed, the blind-spot monitoring device 100 may perform a process of instructing the specific nearby vehicle located in the rider blind spots to prevent the steering wheel from rotating or to vibrate the steering wheel in order to alert the specific nearby driver.

Also, in case that the specific nearby vehicle located in the rider blind spots is an autonomous vehicle, if the driving plan of the autonomous vehicle is determined as representing moving into the nearby front area of the cycle by referring to (i) the autonomous vehicle location, the autonomous vehicle traveling direction, and the autonomous vehicle traveling speed acquired from the sensor information of the autonomous vehicle and (ii) the cycle location, the cycle traveling direction, and the cycle traveling speed, then the blind-spot monitoring device 100 may perform a process of instructing the autonomous vehicle located in the rider blind spots to prevent itself from changing the lanes due to the driving plan.

As described above, the present disclosure performs a process of acquiring a blind-spot detection result based on a helmet orientation created via detecting the blind spots by referring to the sensor information from the camera or the radar sensor installed on the smart helmet, a process of confirming the smart helmet orientation by monitoring a driver's status using humans' status recognition, a process of notifying the rider of a blind-spot detection result based on the cycle traveling direction, which is converted from the blind-spot detection result based on the helmet orientation by referring to the smart helmet orientation and the cycle traveling direction, a process of confirming the rider blind spots perceivable by none of the sensing angles of the camera or the radar sensor installed on the smart helmet and the viewing angle of the rider wearing the smart helmet, and a process of transmitting the confirmed rider blind spots to the nearby vehicles or the nearby cycles over the V2X communication, to thereby allow the nearby vehicles or the nearby cycles to safely travel by referring to the rider blind spots.

The present disclosure has an effect of preventing traffic accidents by allowing the rider of the cycle being driven to perceive surrounding environment of the cycle.

The present disclosure has another effect of improving a driving quality of the rider by allowing the rider of the cycle to perceive the surrounding environment of the cycle.

The present disclosure has still another effect of allowing the nearby vehicles to safely travel by transmitting information acquired by the rider of the cycle to the nearby vehicles over the V2X communication, and as a result, reducing the traffic accidents on a roadway.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for monitoring at least one blind spot of a cycle using a smart helmet to be used for a rider of the cycle, comprising steps of:
   (a) if at least one video image of one or more 1-st blind spots corresponding to the smart helmet worn by the rider is acquired, a blind-spot monitoring device performing a process of instructing an object detector to detect one or more objects on the video image and a process of confirming one or more 1-st objects located in the 1-st blind spots among the detected objects; and
   (b) the blind-spot monitoring device performing a process of determining a smart helmet orientation and a cycle traveling direction by referring to sensor information acquired from at least part of a GPS sensor, an acceleration sensor, and a geomagnetic sensor installed on the smart helmet, a process of confirming one or more 2-nd objects, among the 1-st objects, located in one or more 2-nd blind spots corresponding to the cycle by referring to the smart helmet orientation and the cycle traveling direction, and a process of displaying the 2-nd objects via a head-up display installed on the smart helmet or sounding an alarm representing that the 2-nd objects are located in the 2-nd blind spots via at least one speaker installed on the smart helmet.

2. The method of claim 1, wherein the step of (b) further includes a step of:
   (b1) the blind-spot monitoring device performing a process of transmitting (i) rider blind-spot information acquired by referring to a viewing angle of the rider wearing the smart helmet and to one or more sensing angles of a radar sensor or a camera taking the video image and (ii) a cycle location, the cycle traveling direction, and a cycle traveling speed acquired by referring to the sensor information, to one or more nearby vehicles and one or more nearby smart helmets corresponding to one or more nearby cycles, to thereby perform at least one of processes of (1) allowing at least one specific nearby vehicle, among the nearby vehicles, located in one or more rider blind spots (1-a) to determine a possibility of a traffic accident between the specific nearby vehicle and the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, and thus (1-b) to give an alarm to at least one specific nearby driver of the specific nearby vehicle and (2) allowing at least one specific nearby smart helmet, corresponding to at least one specific nearby cycle located in the rider blind spots, among the nearby smart helmets (2-a) to determine a possibility of a traffic accident between the specific nearby cycle and the cycle by referring to (i) a nearby cycle location, a nearby cycle traveling direction, and a nearby cycle traveling speed acquired from sensor information of the specific nearby smart helmet and (ii) the cycle location, the cycle traveling direction, and the cycle traveling speed and thus (2-b) to give an alarm to at least one specific nearby rider corresponding to the specific nearby cycle.

3. The method of claim 2, wherein, if the specific nearby driver of the specific nearby vehicle located in the rider blind spots operates a steering wheel of the specific nearby vehicle to move into a nearby front area of the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, the blind-spot monitoring device performs a process of instructing the specific nearby vehicle located in the rider blind spots to prevent the steering wheel from rotating or to vibrate the steering wheel in order to alert the specific nearby driver.

4. The method of claim 2, wherein, in case the specific nearby vehicle located in the rider blind spots is an autonomous vehicle, if a driving plan of the autonomous vehicle is determined as representing moving into the nearby front area of the cycle by referring to (i) an autonomous vehicle location, an autonomous vehicle traveling direction, and an autonomous vehicle traveling speed acquired from sensor information of the autonomous vehicle and (ii) the cycle location, the cycle traveling direction, and the cycle traveling speed, the blind-spot monitoring device performs a process of instructing the autonomous vehicle located in the rider blind spots to prevent itself from changing lanes due to the driving plan.

5. The method of claim 1, wherein, at the step of (b), the blind-spot monitoring device performs a process of calculating an angular difference between the smart helmet orientation and the cycle traveling direction, a process of converting one or more 1-st locations of the 1-st objects into one or more relative locations corresponding to the cycle traveling direction by using the angular difference, and a process of determining at least part of the 1-st objects, corresponding to at least part of the relative locations matching the 2-nd blind spots, as the 2-nd objects.

6. The method of claim 1, wherein, at the step of (a), the blind-spot monitoring device performs a process of transmitting the video image to the object detector to allow the object detector to (i) input the video image into a convolutional layer, to thereby allow the convolutional layer to generate at least one feature map by applying convolution operation to the video image, (ii) input the feature map into a region proposal network, to thereby allow the region proposal network to generate one or more proposal boxes corresponding to the objects on the feature map, (iii) input the feature map into a pooling layer, to thereby allow the pooling layer to generate at least one feature vector by applying pooling operation to one or more regions, corresponding to the proposal boxes, on the feature map, (iv) input the feature vector into a fully connected layer, to thereby allow the fully connected layer to apply fully-connected operation to the feature vector, and (v) input an output from the fully connected layer respectively into a classification layer and a regression layer, to thereby allow the classification layer and the regression layer to respectively output class information and regression information on each of the objects corresponding to each of the proposal boxes, and thus to detect the objects in the video image.

7. The method of claim 6, wherein the object detector has been learned by a learning device performing (i) a process of inputting a training image into the convolutional layer, to thereby allow the convolutional layer to generate a feature map for training by applying convolution operation to the training image, (ii) a process of inputting the feature map for training into the region proposal network, to thereby allow the region proposal network to generate one or more proposal boxes for training corresponding to one or more objects for training on the feature map for training, (iii) a process of inputting the feature map for training into the pooling layer, to thereby allow the pooling layer to generate a feature vector for training by applying pooling operation to one or more regions, corresponding to the proposal boxes for training, on the feature map for training, (iv) a process of inputting the feature vector for training into the fully connected layer, to thereby allow the fully connected layer to apply fully-connected operation to the feature vector for training, (v) a process of inputting at least one output for training from the fully connected layer respectively into the classification layer and the regression layer, to thereby allow the classification layer and the regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the fully connected layer and the convolutional layer by backpropagating the losses such that the losses are minimized.

8. A method for monitoring at least one blind spot of a cycle using a smart helmet to be used for a rider of the cycle, comprising steps of:
  (a) if sensor information is acquired from at least part of a GPS sensor, an acceleration sensor, and a geomagnetic sensor installed on the smart helmet worn by the rider of the cycle, a blind-spot monitoring device performs a process of acquiring a cycle location, a cycle traveling direction, and a cycle traveling speed by referring to the sensor information; and
  (b) the blind-spot monitoring device performing a process of transmitting (i) rider blind-spot information acquired by referring to a viewing angle of the rider wearing the smart helmet and to one or more sensing angles of a radar sensor or a camera installed on the smart helmet and (ii) the cycle location, the cycle traveling direction, and the cycle traveling speed, to one or more nearby vehicles and one or more nearby smart helmets corresponding to one or more nearby cycles, to thereby perform at least one of processes of (1) allowing at least one specific nearby vehicle, among the nearby vehicles, located in one or more rider blind spots (1-a) to determine a possibility of a traffic accident between the specific nearby vehicle and the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, and thus (1-b) to alert at least one specific nearby driver of the specific nearby vehicle and (2) allowing at least one specific nearby smart helmet, corresponding to at least one specific nearby cycle located in the rider blind spots, among the nearby smart helmets (2-a) to determine a possibility of a traffic accident between the specific nearby cycle and the cycle by referring to (i) a nearby cycle location, a nearby cycle traveling direction, and a nearby cycle traveling speed acquired from sensor information of the specific nearby smart helmet and (ii) the cycle location, the cycle traveling direction, and the cycle traveling speed and thus (2-b) to alert at least one specific nearby rider corresponding to the specific nearby cycle.

9. The method of claim 8, wherein, at the step of (b), if the specific nearby driver of the specific nearby vehicle located in the rider blind spots operates a steering wheel of the specific nearby vehicle to move into a nearby front area of the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, the blind-spot monitoring device performs a process of instructing the specific nearby vehicle located in the rider blind spots to prevent the steering wheel from rotating or to vibrate the steering wheel in order to alert the specific nearby driver.

10. The method of claim 8, wherein, in case the specific nearby vehicle located in the rider blind spots is an autonomous vehicle, if a driving plan of the autonomous vehicle is determined as representing moving into the nearby front area of the cycle by referring to (i) an autonomous vehicle location, an autonomous vehicle traveling direction, and an autonomous vehicle traveling speed acquired from sensor information of the autonomous vehicle and (ii) the cycle location, the cycle traveling direction, and the cycle traveling speed, the blind-spot monitoring device performs a process of instructing the autonomous vehicle located in the rider blind spots to prevent itself from changing lanes due to the driving plan.

11. A blind-spot monitoring device for monitoring at least one blind spot of a cycle using a smart helmet to be used for a rider of the cycle, comprising:
at least one memory that stores instructions; and
at least one processor configured to execute the instructions to perform or support another device to perform:
(I) if at least one video image of one or more 1-st blind spots corresponding to the smart helmet worn by the rider is acquired, a process of instructing an object detector to detect one or more objects on the video image and a process of confirming one or more 1-st objects located in the 1-st blind spots among the detected objects, and (II) a process of determining a smart helmet orientation and a cycle traveling direction by referring to sensor information acquired from at least part of a GPS sensor, an acceleration sensor, and a geomagnetic sensor installed on the smart helmet, a process of confirming one or more 2-nd objects, among the 1-st objects, located in one or more 2-nd blind spots corresponding to the cycle by referring to the smart helmet orientation and the cycle traveling direction, and a process of displaying the 2-nd objects via a head-up display installed on the smart helmet or sounding an alarm representing that the 2-nd objects are located in the 2-nd blind spots via at least one speaker installed on the smart helmet.

12. The blind-spot monitoring device of claim 11, wherein the process of (II) further includes:
(II-1) a process of transmitting (i) rider blind-spot information acquired by referring to a viewing angle of the rider wearing the smart helmet and to one or more sensing angles of a radar sensor or a camera taking the video image and (ii) a cycle location, the cycle traveling direction, and a cycle traveling speed acquired by referring to the sensor information, to one or more nearby vehicles and one or more nearby smart helmets corresponding to one or more nearby cycles, to thereby perform at least one of processes of (1) allowing at least one specific nearby vehicle, among the nearby vehicles, located in one or more rider blind spots (1-a) to determine a possibility of a traffic accident between the specific nearby vehicle and the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, and thus (1-b) to give an alarm to at least one specific nearby driver of the specific nearby vehicle and (2) allowing at least one specific nearby smart helmet, corresponding to at least one specific nearby cycle located in the rider blind spots, among the nearby smart helmets (2-a) to determine a possibility of a traffic accident between the specific nearby cycle and the cycle by referring to (i) a nearby cycle location, a nearby cycle traveling direction, and a nearby cycle traveling speed acquired from sensor information of the specific nearby smart helmet and (ii) the cycle location, the cycle traveling direction, and the cycle traveling speed and thus (2-b) to give an alarm to at least one specific nearby rider corresponding to the specific nearby cycle.

13. The blind-spot monitoring device of claim 12, wherein, if the specific nearby driver of the specific nearby vehicle located in the rider blind spots operates a steering wheel of the specific nearby vehicle to move into a nearby front area of the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, the processor performs a process of instructing the specific nearby vehicle located in the rider blind spots to prevent the steering wheel from rotating or to vibrate the steering wheel in order to alert the specific nearby driver.

14. The blind-spot monitoring device of claim 12, wherein, in case the specific nearby vehicle located in the rider blind spots is an autonomous vehicle, if a driving plan of the autonomous vehicle is determined as representing moving into the nearby front area of the cycle by referring to (i) an autonomous vehicle location, an autonomous vehicle traveling direction, and an autonomous vehicle traveling speed acquired from sensor information of the autonomous vehicle and (ii) the cycle location, the cycle traveling direction, and the cycle traveling speed, the processor performs a process of instructing the autonomous vehicle located in the rider blind spots to prevent itself from changing lanes due to the driving plan.

15. The blind-spot monitoring device of claim 11, wherein, at the process of (II), the processor performs a process of calculating an angular difference between the smart helmet orientation and the cycle traveling direction, a process of converting one or more 1-st locations of the 1-st objects into one or more relative locations corresponding to the cycle traveling direction by using the angular difference, and a process of determining at least part of the 1-st objects, corresponding to at least part of the relative locations matching the 2-nd blind spots, as the 2-nd objects.

16. The blind-spot monitoring device of claim 11, wherein, at the process of (I), the processor performs a process of transmitting the video image to the object detector to allow the object detector to (i) input the video image into a convolutional layer, to thereby allow the convolutional layer to generate at least one feature map by applying convolution operation to the video image, (ii) input the feature map into a region proposal network, to thereby allow the region proposal network to generate one or more proposal boxes corresponding to the objects on the feature map, (iii) input the feature map into a pooling layer, to thereby allow the pooling layer to generate at least one feature vector by applying pooling operation to one or more regions, corresponding to the proposal boxes, on the feature map, (iv) input the feature vector into a fully connected layer, to thereby allow the fully connected layer to apply fully-connected operation to the feature vector, and (v) input an output from the fully connected layer respectively into a classification layer and a regression layer, to thereby allow the classification layer and the regression layer to respectively output class information and regression information on each of the objects corresponding to each of the proposal boxes, and thus to detect the objects in the video image.

17. The blind-spot monitoring device of claim 16, wherein the object detector has been learned by a learning device performing (i) a process of inputting a training image into the convolutional layer, to thereby allow the convolutional layer to generate a feature map for training by applying convolution operation to the training image, (ii) a process of inputting the feature map for training into the region proposal network, to thereby allow the region proposal network to generate one or more proposal boxes for training corresponding to one or more objects for training on the feature map for training, (iii) a process of inputting the feature map for training into the pooling layer, to thereby allow the pooling layer to generate a feature vector for training by applying pooling operation to one or more regions, corresponding to the proposal boxes for training, on the feature map for training, (iv) a process of inputting the feature vector for training into the fully connected layer, to thereby allow the fully connected layer to apply fully-connected operation to the feature vector for training, (v) a process of inputting at least one output for training from the fully connected layer respectively into the classification layer and the regression layer, to thereby allow the classification layer and the regression layer to respectively output class information for training and regression information for training on each of the objects for training corresponding to each of the proposal boxes for training, and (vi) a process of allowing a loss layer to calculate one or more losses by referring to the class information for training, the regression information for training, and their respective corresponding GTs, to thereby update at least one parameter of at least one of the fully connected layer and the convolutional layer by backpropagating the losses such that the losses are minimized.

18. A blind-spot monitoring device for monitoring at least one blind spot of a cycle using a smart helmet to be used for a rider of the cycle, comprising:
   at least one memory that stores instructions; and
   at least one processor configured to execute the instructions to perform or support another device to perform:
   (I) if sensor information is acquired from at least part of a GPS sensor, an acceleration sensor, and a geomagnetic sensor installed on the smart helmet worn by the rider of the cycle, a process of acquiring a cycle location, a cycle traveling direction, and a cycle traveling speed by referring to the sensor information, and
   (II) a process of transmitting (i) rider blind-spot information acquired by referring to a viewing angle of the rider wearing the smart helmet and to one or more sensing angles of a radar sensor or a camera installed on the smart helmet and (ii) the cycle location, the cycle traveling direction, and the cycle traveling speed, to one or more nearby vehicles and one or more nearby smart helmets corresponding to one or more nearby cycles, to thereby perform at least one of processes of (1) allowing at least one specific nearby vehicle, among the nearby vehicles, located in one or more rider blind spots (1-a) to determine a possibility of a traffic accident between the specific nearby vehicle and the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, and thus (1-b) to alert at least one specific nearby driver of the specific nearby vehicle and (2) allowing at least one specific nearby smart helmet, corresponding to at least one specific nearby cycle located in the rider blind spots, among the nearby smart helmets (2-a) to determine a possibility of a traffic accident between the specific nearby cycle and the cycle by referring to (i) a nearby cycle location, a nearby cycle traveling direction, and a nearby cycle traveling speed acquired from sensor information of the specific nearby smart helmet and (ii) the cycle location, the cycle traveling direction, and the cycle traveling speed and thus (2-b) to alert at least one specific nearby rider corresponding to the specific nearby cycle.

19. The blind-spot monitoring device of claim 18, wherein, at the process of (II), if the specific nearby driver of the specific nearby vehicle located in the rider blind spots operates a steering wheel of the specific nearby vehicle to move into a nearby front area of the cycle by referring to (i) a vehicle location, a vehicle traveling direction, and a vehicle traveling speed acquired from sensor information of the specific nearby vehicle and (ii) the cycle location, the cycle traveling direction, and the cycle traveling speed, the processor performs a process of instructing the specific nearby vehicle located in the rider blind spots to prevent the steering wheel from rotating or to vibrate the steering wheel in order to alert the specific nearby driver.

20. The blind-spot monitoring device of claim 18, wherein, in case the specific nearby vehicle located in the rider blind spots is an autonomous vehicle, if a driving plan of the autonomous vehicle is determined as representing moving into the nearby front area of the cycle by referring to (i) an autonomous vehicle location, an autonomous vehicle traveling direction, and an autonomous vehicle traveling speed acquired from sensor information of the autonomous vehicle and (ii) the cycle location, the cycle traveling direction, and the cycle traveling speed, the processor performs a process of instructing the autonomous vehicle located in the rider blind spots to prevent itself from changing lanes due to the driving plan.

* * * * *